Patented Oct. 19, 1926.

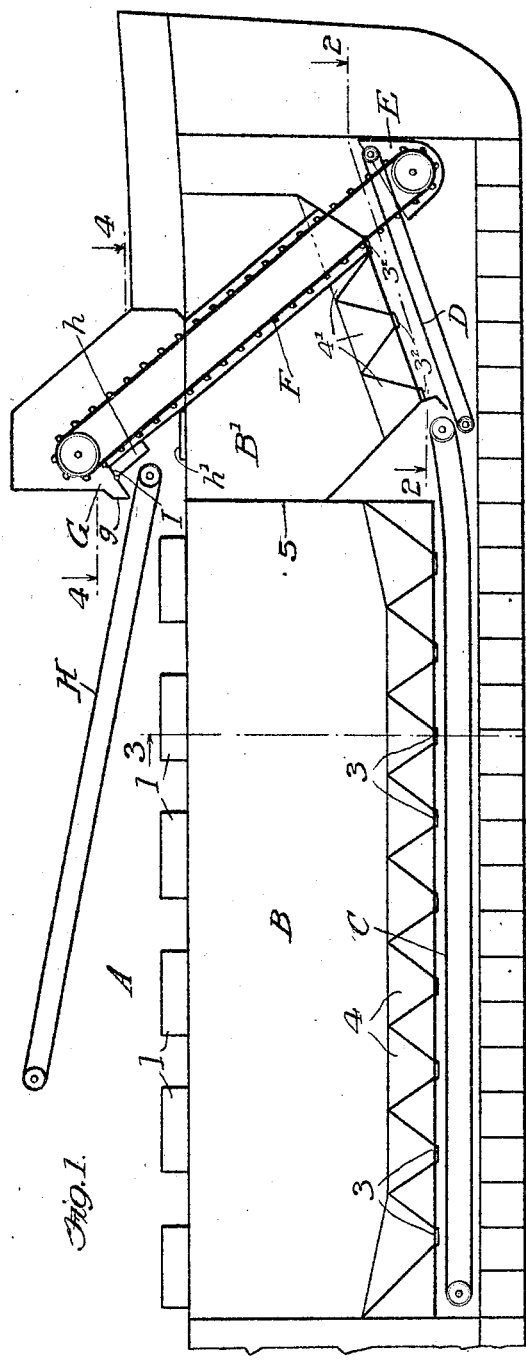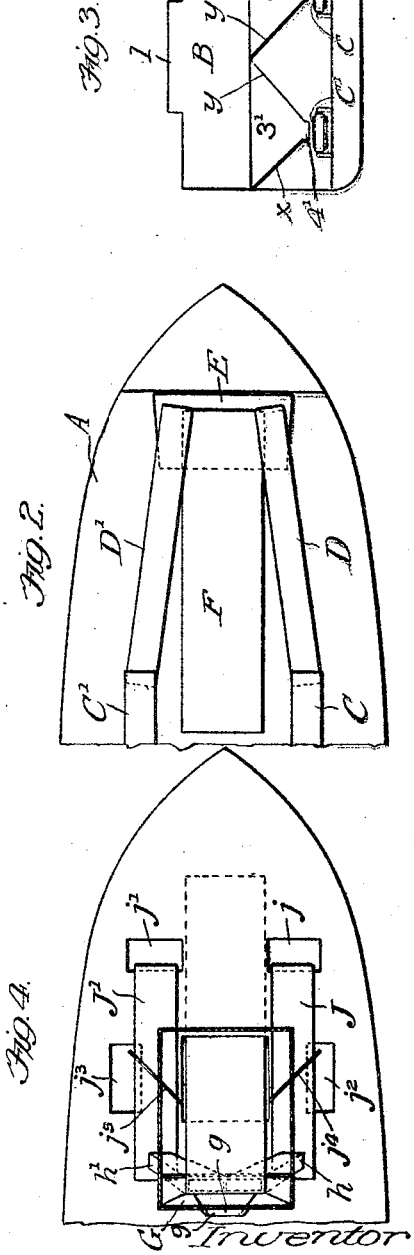

1,603,498

UNITED STATES PATENT OFFICE.

WILLIAM L. WALLACE, OF MANITOWOC, WISCONSIN, ASSIGNOR TO MANITOWOC SHIP BUILDING CORPORATION, OF MANITOWOC, WISCONSIN, A CORPORATION OF WISCONSIN.

SHIP AND CARGO-HANDLING MEANS THEREFOR.

Application filed April 6, 1925. Serial No. 20,906.

This invention relates to ships and relates particularly to unloading equipment for so-called self-unloading ships.

Ships of the type to which the present invention relates are especially designed and adapted for carrying freight in bulk, the cargo space of the ship comprising a bunker in the hold of the ship provided with series of discharge openings in its bottom, comprising series arranged symmetrically at opposite sides of the longitudinal center line of the ship, and the unloading equipment comprising hold conveyors—usually belt conveyors—which extend beneath said series of discharge openings. Said unloading equipment also comprises a hopper located forward of the bunker forming the cargo space, into which said hold conveyors discharge and an elevator for raising cargo from said hopper and discharge it upon a boom conveyor pivotally mounted on the deck of the ship and adapted for delivering the cargo at a desired point of deposit.

The unloading equipment of ships of the type specified usually comprises two conveyors, but, in the case of ships which have great beam, a third conveyor, arranged at the center line of the ship, may be employed, if desired.

Heretofore, so far as I am aware, the hold conveyors have extended parallel with the longitudinal center line of the ship and have discharged directly into the hopper forward of the bunker forming the cargo space, "fining up" of the bow, necessitating that the front ends of said conveyors—and thus of the hopper into which they discharge—be raised in order that the sides of the ship at the bow shall not interfere with the installation and operation of said hold conveyors. Due to the space required for thus elevating the forward ends of said hold conveyors, the space occupied by the hopper into which they discharge, and the elevator for delivering cargo from said hopper to the boom conveyor on deck, so little cargo space is available at the bow of the ship, that it does not warrant the expense of installing bunker space and unloading equipment for the small amount of additional cargo which could be carried.

Besides decreasing the quantity of cargo carried, a further objectionable feature of the construction specified is that it is difficult to bring the ship to a normal trim, due to the light weight of cargo that can be carried forward.

Also, in order that bulk cargo contained in the cargo bunker shall run by gravity through the discharge openings therein, the bottom of said bunker is made in the form of hopper-shaped pockets, each provided with a discharge opening at its lower end, the sides of said pockets adjacent to the sides of the ship being formed by the bottom of the cargo bunker, which comprises sections which are inclined inwardly and downwardly at proper angles. Due to fining of the bow of the ship, it is necessary, in practice, to install the conveyors considerably closer to the center of the ship than to the sides thereof, thereby still further reducing the cargo capacity of the ship, due to the fact that said inclined sections of the bottom of the bunker extend considerably nearer to the center of the ship and a considerable distance higher on the sides of the ship than would be the case if the hold conveyors were positioned equi-distant between the center and sides of the ship.

The object of the present invention is to overcome the foregoing objectionable features and to provide a self-unloading ship which will carry its full designed maximum cargo capacity and in which the bow of the ship will be brought to its designed load water line, when loaded—that is to its normal trim.

In accordance with my invention, I attain the objects thereof by the use of hold conveyors comprising conveyors positioned substantially mid-way between the center of the ship and the sides thereof, the forward ends of which terminate substantially at the point where the bow of the ship begins to fine up and extension conveyors adapted to receive cargo from said first conveyors and to deliver it into the hopper supported forward of the cargo bunker, said extension conveyors converging inwardly to clear the sides of the bow of the ship. The unloading equipment also comprises an elevator adapted to receive cargo from said hopper and to deliver it to the boom conveyor mounted on the deck of the ship.

As the invention relates to bringing the bow of the ship to its designed load water line, when loaded, I attain the object of the invention by providing additional cargo bunker space in the bow of the ship together with means in association with the cargo unloading equipment for delivering cargo into said forward cargo space, said means consisting of a hopper into which the elevator which delivers cargo to the boom conveyor discharges, said hopper being provided with a plurality of spouts, one adapted to deliver cargo upon the boom conveyor and another or others adapted to deliver cargo into the bunker space in the bow of the ship either directly through holes provided for the purpose, or upon conveyors from which the cargo is discharged either directly into the forward bunker space or which may be removed therefrom by means of scrapers.

My invention also comprises the various other features, combination of features and details of construction hereinafter described and claimed.

In the accompanying drawings in which my invention is fully illustrated,

Figure 1 is a diagrammatic longitudinal sectional elevation of the forward portion of a ship equipped with an unloading conveyor embodying my invention and improvements.

Figure 2 is a fragmentary sectional plan view on the line 2—2 of Fig. 1.

Figure 3 is a transverse sectional view on the line 3—3 of Fig. 1; and

Figure 4 is a sectional plan view on the line 4—4 of Fig. 1.

My invention does not reside in mechanical details of construction either of the bunkers which form the cargo space or of the unloading mechanism. Thus, while the drawings are in diagram only, they, in connection with the accompanying specification, will enable persons skilled in the art to understand the invention and to construct ships embodying the same.

Referring now to the drawings, A designates the hull of a ship built into the hold of which is a cargo bunker B adapted for containing bulk freight, as sand, gravel, crushed rock, grain, coal, and the like.

Bulk freight is adapted to be delivered into the bunker B in loading the ship through hatches 1 formed in the weather deck of the ship.

Cargo is adapted to be discharged from the bunker B in unloading the ship through discharge openings 3, 3' in the bottom of the bunker B, said discharge openings being arranged in symmetrical series on opposite sides of the center line of the ship substantially mid-way between the center line of the ship and the sides thereof. In order that cargo in bulk may flow by gravity through the discharge openings 3, 3', said discharge openings are formed at the lower ends of hopper-shaped pockets 4 formed in the bottom of the bunker B and which preferably cover the entire surface thereof.

The cargo unloading mechanism comprises conveyors C, C' mounted beneath the bunker B in line with the series of discharge openings 3, 3' so that cargo discharged through said opening will fall upon said conveyors.

The forward ends of said conveyors terminate substantially at or slightly forward of the points at which the bow of the ship begins to fine. Said unloading equipment also comprises extension hold conveyors D, D', the after ends of which extend beneath the forward ends of the conveyors C, C', so as to receive cargo therefrom, and the front ends of which discharge into a hopper E supported in the hold of the ship forward of the cargo bunker.

Owing to fining of the bow of the ship, the extension conveyors D, D' converge forward and are preferably upwardly and forwardly inclined so that they will clear the sides of the bow, the hopper E being correspondingly raised.

From the hopper E cargo is adapted to be delivered by means of a bucket elevator F into what, for purposes of convenient reference, may be designated a hopper G provided with a spout $g$ which discharges onto a boom conveyor H mounted on the deck of the ship so as to be pivotally movable about an upright axis and which is adapted to deliver cargo at any desired point of deposit.

The forward ends of the conveyors C, C' are preferably raised slightly to permit the after ends of the extension conveyors D, D' to extend beneath the same.

By the use of the separate extension conveyors D, D' I am able to use hold conveyors C, C' positioned substantially mid-way between the center line of the ship and the sides thereof; and to mount said conveyors C, C' so that they will run substantially parallel with the bottom of the ship throughout their length, thus permitting the use of a bunker B, the plane of the bottom of which will be substantially parallel with the bottom of the ship instead of decreasing in depth towards its forward end, in the manner heretofore common.

By the use of separate converging conveyors, D, D', I am also able to keep the front ends of said auxiliary conveyors D, D' and the hopper E, into which said auxiliary conveyors discharge, at such low elevation above the bottom of the ship that cargo space of practical size is available in the bow of the ship forward of the bunker B. To utilize said additional cargo space, a cargo bunker B' may be built into the bow of the ship forward of the bunker B, said bunker B' either forming an extension of the bunker B or being separated therefrom by a bulkhead 5.

The bottom of the bunker B' consists of a plurality of hopper-shaped pockets 4', formed in the lower end of which are a series of discharge openings $3^2$, arranged above and in line with the extension hold conveyors D, D'.

The object of the invention as it relates to means for delivering cargo into the bunker B', is attained by means, in association with the unloading mechanism heretofore described, adapted for delivering cargo from the hopper G into the bunker B'. What I now consider the simplest means for thus delivering cargo from the hopper G into said bunker B' consists in providing said hopper G with a spout or spouts $h$, which discharge directly through a hatch or hatches $h'$ into said bunker B'. The spouts $g$ and $h$ of said hopper G are controlled by a pivoted swing valve I, which when turned into one extreme position, will open the spout $g$ and close the spout or spouts $h$ and vice versa. As shown, there are two spouts $h$ adapted to deliver into hatch $h'$ on opposite sides of the center line of the ship, thus avoiding the elevator F.

As a modification, I contemplate a construction in which the spouts $h^2$, instead of discharging directly into the bunker B', discharge cargo upon conveyors—preferably belt conveyors—which may either discharge directly through hatches into said bunker, or from which the cargo may be removed by scrapers and discharged through hatches at the sides of said conveyors into said bunker.

This modification is shown in Fig. 4 of the drawings, in which J, J' are belt conveyors onto which the spouts $h$, $h'$ discharge, $j$, $j'$, hatches at the ends of said conveyors into which said conveyors discharge, respectively, $j^2$, $j^3$ are hatches arranged, respectively, at the remote sides of said conveyors, and $j^4$, $j^5$, scrapers adapted to scrape cargo from said conveyors J, J' into said hatches $j^2$, $j^3$, said scrapers being movably supported so that they may be moved into operative or inoperative positions, as it is desired to deliver cargo into the hatches $j$, $j^1$ or $j^2$, $j^3$, respectively.

I claim:—

1. In a cargo carrying ship of the type specified, the combination of a main bunker in the hold of the ship and an auxiliary bunker forward of said main bunker which together form the cargo carrying space of the ship, said bunkers being provided with discharge openings in their bottoms, a system of conveyors constructed and arranged for receiving bulk freight from the discharge openings in said cargo bunkers and delivering it at a desired point of deposit, and means in association with said unloading conveyors for delivering cargo into the auxiliary cargo bunker.

2. The combination as specified in claim 1, in which the unloading conveyors comprise an elevator conveyor, and which also comprises means for delivering cargo from said elevator conveyor into the auxiliary cargo bunker.

3. The combination as specified in claim 1, in which the unloading conveyors comprise an elevator conveyor and a boom conveyor, and which comprises a hopper into which said elevator conveyor discharges having spouts adapted for discharging cargo from said hopper upon the boom conveyor and into the auxiliary cargo bunker, respectively, and valve means constructed and arranged for separately opening and closing said spouts.

4. The combination as specified in claim 1, in which the hull of the ship fines forward and the discharge conveyors comprise conveyors which extend lengthwise of the ship and are arranged symmetrically at opposite sides of its longitudinal center, a raised hopper forward of the auxiliary cargo bunker, extension hold conveyors arranged, respectively, to receive cargo from said first mentioned conveyors and to deliver it into said hopper, and which converge forward to compensate for fining of the bow, a conveyor adapted to elevate cargo from the hold hopper, and means for delivering cargo from said elevator conveyor into the auxiliary cargo bunker.

In witness that I claim the foregoing as my invention, I have hereunto affixed my signature this 18th day of March, 1925.

WILLIAM L. WALLACE.